United States Patent
Takahashi

(10) Patent No.: US 9,700,812 B2
(45) Date of Patent: Jul. 11, 2017

(54) CRYOPUMP

(71) Applicant: Sumitomo Heavy Industries, Ltd., Tokyo (JP)

(72) Inventor: Kakeru Takahashi, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 118 days.

(21) Appl. No.: 14/197,882

(22) Filed: Mar. 5, 2014

(65) Prior Publication Data

US 2014/0250923 A1  Sep. 11, 2014

(30) Foreign Application Priority Data

Mar. 5, 2013  (JP) ................................. 2013-043541

(51) Int. Cl.
*B01D 8/00* (2006.01)
*F04B 37/08* (2006.01)

(52) U.S. Cl.
CPC ................ *B01D 8/00* (2013.01); *F04B 37/08* (2013.01)

(58) Field of Classification Search
CPC ........... F04B 37/08; F04B 37/085; B01D 8/00
USPC ....................................................... 62/55.5
See application file for complete search history.

(56) References Cited

U.S. PATENT DOCUMENTS

| 4,295,338 | A | * | 10/1981 | Welch | F04B 37/08 |
| | | | | | 417/901 |
| 2009/0165469 | A1 | * | 7/2009 | Matsubara | F04B 37/08 |
| | | | | | 62/55.5 |
| 2011/0225989 | A1 | * | 9/2011 | Tanaka | B01D 8/00 |
| | | | | | 62/55.5 |
| 2012/0222431 | A1 | | 9/2012 | Tanaka | |

FOREIGN PATENT DOCUMENTS

| CN | 102686880 A | 9/2012 |
| JP | 2551204 B2 | 11/1996 |
| JP | H10-213065 A | 8/1998 |
| JP | 2008-514849 A | 5/2008 |
| WO | WO-2006/036257 A1 | 4/2006 |
| WO | WO-2012109304 A2 | 8/2012 |

* cited by examiner

*Primary Examiner* — Len Tran
*Assistant Examiner* — Ana Vazquez
(74) *Attorney, Agent, or Firm* — Michael Best & Friedrich LLP

(57) ABSTRACT

A cryopump includes: a cryopanel assembly including a plurality of cryopanels each having an adsorption area on both surfaces thereof; a radiation shield forming a gas receiving space that surrounds the cryopanel assembly; and a radiation cover disposed in a cryopump inlet. The radiation cover includes a main plate located at a position in the cryopanel inlet that corresponds to the cryopanel assembly and a louver portion located at a position in the cryopanel inlet that corresponds to the gas receiving space. The radiation cover may not include the louver portion.

18 Claims, 2 Drawing Sheets

CRYOPUMP

BACKGROUND

1. Technical Field

The present invention relates to a cryopump.

2. Description of the Related Art

A conventional cryopump is constituted by a first stage cold head, a first stage shield and a first stage baffle that are connected to the first stage cold head, a second stage cold head, and a second stage cryopanel connected to the second stage cold head, and adsorbent that is mounted to the back surface of the second stage cryopanel. This cryopump performs vacuum evacuation by condensing gas on the first stage shield, the first stage baffle, and the second stage cryopanel that are cooled by a He refrigerator.

SUMMARY

An exemplary purpose of an embodiment of the present invention is to provide a cryopump that is suitable for high-speed evacuation of non-condensable gas such as hydrogen gas.

According to one embodiment of the present invention, there is provided a cryopump including: a cryopanel assembly including a plurality of cryopanels each having an adsorption area on both surfaces thereof; a radiation shield forming a gas receiving space that surrounds the cryopanel assembly; and a radiation cover disposed in a cryopump inlet, the radiation cover including a main plate located at a first position in the cryopanel inlet that corresponds to the cryopanel assembly and a louver portion located at a second position in the cryopanel inlet that corresponds to the gas receiving space.

According to one embodiment of the present invention, there is provided a cryopump including: a cryopanel assembly including a plurality of cryopanels each having an adsorption area on both surfaces thereof; and a radiation cover disposed in a cryopump inlet, wherein the cryopanel assembly includes a top panel that faces the radiation cover, and wherein the radiation cover includes a main plate that covers at least 80 percent of a projection area of the top panel and that occupies at most ⅓ of an opening area of the cryopump inlet.

Implementations of the invention in the form of methods, apparatuses, and systems, may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The invention will now be described by reference to the preferred embodiments. This does not intend to limit the scope of the present invention, but to exemplify the invention.

Figure 1:
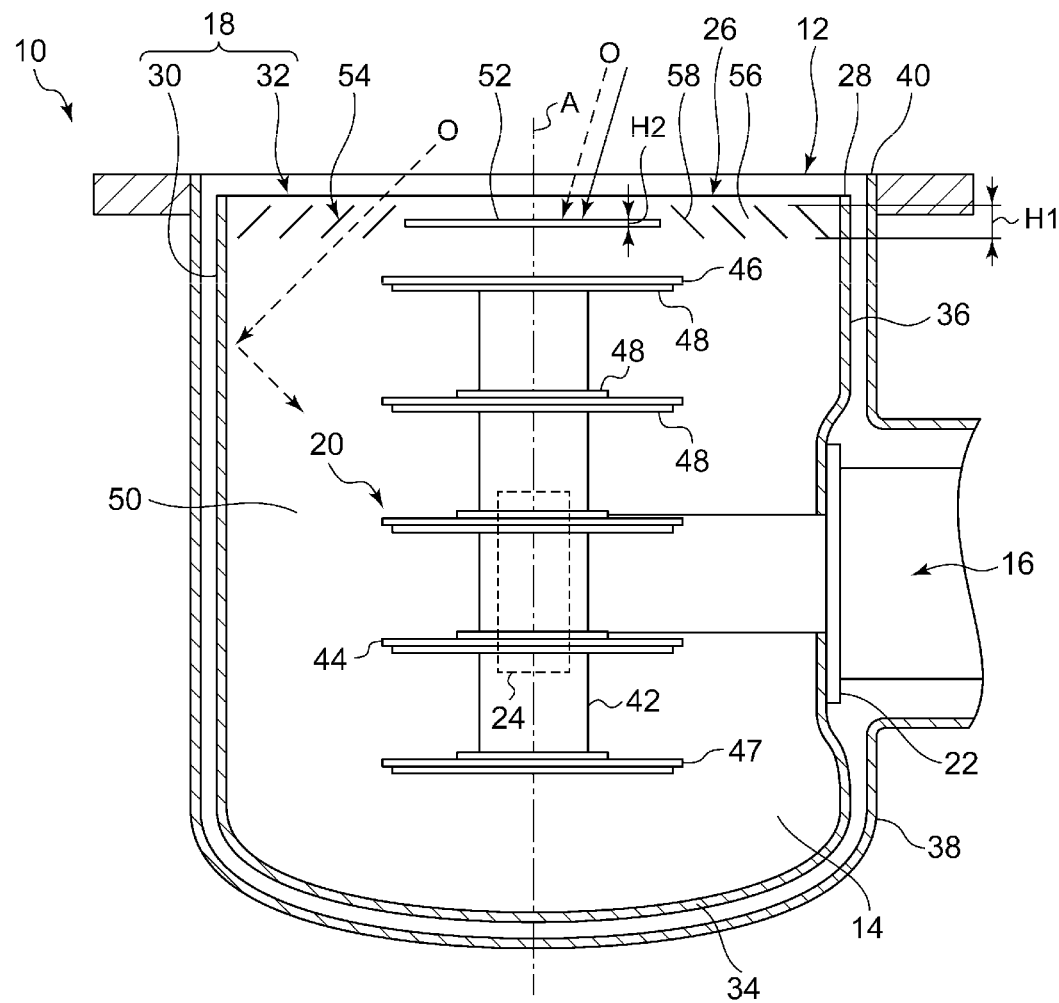
FIG. 1 is a cross-sectional view schematically illustrating the principal part of a cryopump according to an embodiment of the present invention.

FIG. 1 is a cross-sectional view schematically illustrating the principal part of a cryopump 10 according to an embodiment of the present invention. The cryopump 10 is installed in a vacuum chamber in, for example, an ion implantation apparatus, sputtering apparatus, or the like, to be used for improving the vacuum degree of the inside of the vacuum chamber to a level required in a desired process. The cryopump 10 has an inlet 12 for receiving gas. Gas to be pumped enters an internal space 14 of the cryopump 10 via the inlet 12 from the vacuum chamber in which the cryopump 10 is mounted. FIG. 1 illustrates a cross section including a central axis A of the internal space 14 of the cryopump 10.

In the following, terms "axial direction" and "radial direction" are often used to facilitate the understanding of a positional relationship of constituting elements of the cryopump 10. The axial direction represents a direction passing through the inlet 12 (a direction along a dashed-dotted line A in FIG. 1), and the radial direction represents a direction along the inlet 12 (a direction perpendicular to the dashed-dotted line A). For the sake of convenience, relative closeness to the inlet 12 in the axial direction may be referred to as "upper" and "upward," and relative remoteness therefrom may be referred to as "lower" and "downward." In other words, relative remoteness from the bottom of the cryopump 10 may be referred to as "upper" and "upward," and relative closeness thereto may be referred to as "lower" and "downward," both in the axial direction. With respect to the radial direction, relative closeness to the center of the inlet 12 (a central axis A in FIG. 1) may be referred to as "inner" and "inside," and relative closeness to the circumference of the inlet 12 may be referred to as "outer" and "outside." It should be noted that these expressions are not related to a position of the cryopump 10 as mounted on a vacuum chamber. For example, the cryopump 10 may be mounted on a vacuum chamber in such a manner that the inlet 12 faces downward in the vertical direction.

The cryopump 10 includes a refrigerator 16. The refrigerator 16 is, for example, a cryogenic refrigerator such as a Gifford-McMahon refrigerator (so-called GM refrigerator). The refrigerator 16 is a two-stage refrigerator provided with a first stage 22 and a second stage 24. The refrigerator 16 is configured to cool the first stage 22 to a first temperature level and cool the second stage 24 to a second temperature level. The second temperature level is lower than the first temperature level. For example, the first stage 22 is cooled to approximately 65 K to 120 K and preferably to 80 K to 100 K, and the second stage 24 is cooled to approximately 10 K to 20 K.

The cryopump 10 illustrated in FIG. 1 is a so-called horizontal-type cryopump. In general, a horizontal-type cryopump is a cryopump arranged such that the refrigerator 16 intersects (orthogonally in general) with the central axis A of the internal space 14 of the cryopump 10. The present invention is also applicable to a so-called vertical-type cryopump in a similar manner. A vertical-type cryopump is a cryopump with a refrigerator arranged along the axial direction of the cryopump.

The cryopump 10 includes a first cryopanel 18 and a cryopanel assembly 20. The first cryopanel 18 is a cryopanel that is provided to protect the cryopanel assembly 20 from radiant heat from the outside of the cryopump 10 or a cryopump housing 38. The first cryopanel 18 includes a radiation shield 30 and a radiation cover 32 and surrounds the cryopanel assembly 20. The first cryopanel 18 is thermally connected to the first stage 22. Therefore, the first cryopanel 18 is cooled to the first temperature level.

The cryopanel assembly 20 is arranged in a center portion of the internal space 14 of the cryopump 10. The cryopanel assembly 20 includes a plurality of cryopanels and a panel mounting member 42. The cryopanel assembly 20 is mounted to the second stage 24 via the panel mounting member 42. In this way, the cryopanel assembly 20 is thermally connected to the second stage 24. Thus, the cryopanel assembly 20 is cooled to the second temperature level.

An adsorption area 48 is formed on at least part of the surface of the cryopanel assembly 20. The adsorption area 48 is provided to capture non-condensable gas (e.g., hydrogen) by adsorption. The adsorption area 48 is formed by, for example, attaching an adsorbent (e.g., activated charcoal) to a cryopanel surface. Further, a condensation area for capturing condensable gas by condensing the condensable gas is formed on at least part of the cryopanel assembly 20. The condensation area is, for example, a section where the absorbent is absent on a cryopanel surface, exposing the surface (e.g., metal surface) of a cryopanel substrate. The condensation area can be also called a non-adsorption area. Therefore, the cryopanel assembly 20 includes an adsorption panel or a cryosorption panel 44 that has a condensation area (also referred to as non-adsorption area) on part thereof.

A plurality of cryosorption panels 44 are arranged along a direction directed toward a shield bottom portion 34 from a shield opening 26 (i.e., along the central axis A). The plurality of cryosorption panels 44 are each a flat plate (e.g., a disk) that extends perpendicular to the central axis A. The cryosorption panels 44 are mounted to the panel mounting member 42 in parallel with one another. For the sake of ease of explanation, the closest cryosorption panel 44 among the plurality of cryosorption panels 44 to the inlet 12 may be referred to as a top panel 46, and the closest cryosorption panel 44 among the plurality of cryosorption panels 44 to the shield bottom portion 34 may be referred to as a bottom panel 47.

The cryopanel assembly 20 extends elongate along the axial direction between the inlet 12 and the shield bottom portion 34. A distance from the upper end to the lower end of the cryopanel assembly 20 in the axial direction is longer than the external dimension of a vertical projection of the cryopanel assembly 20 in the axial direction. For example, an interval between the top panel 46 and the bottom panel 47 is larger than the widths or diameters of the cryosorption panels 44.

A distance between the upper end of the cryopanel assembly 20 and the radiation cover 32 (more specifically, for example, the top panel 46 and a main plate 52, which is described later) in the axial direction is 5 cm or less, preferably 3 cm or less, and more preferably 1 cm or less. The distance in the axial direction may be about 0.5 to 1.5 times a distance among cryosorption panels 44. As described, the cryopanel assembly 20 faces the radiation cover 32 at a narrow interval. By bringing the cryopanel assembly 20 to be closer to the radiation cover 32, an increased number of cryosorption panels 44 can be arranged toward the shield bottom portion 34. The dimensions of an adsorption area of the cryopump 10 can be enlarged in this manner. Thus, the cryopump 10 is suitable for high-speed pumping of non-condensable gas.

In order to facilitate a task of assembling the cryopump 10, the distance between the upper end of the cryopanel assembly 20 and the radiation cover 32 in the axial direction is preferably larger than a certain degree of interval, for example, 0.5 cm.

The cryosorption panels 44 are flat plates (e.g., disks) that extend perpendicular to the central axis A, and an adsorption area 48 is formed on each surface thereof, i.e., on both surfaces (e.g., the front surface and the back surface) of each cryosorption panel 44. An adsorption area 48 is located on the surface or part thereof behind a cryosorption panel 44 being upwardly adjacent to the adsorption area 48 such that the adsorption area 48 is hidden from the inlet 12. In other words, adsorption areas 48 are formed at the center portion of the upper surface and on the entire lower surface of the respective cryosorption panels 44. Note that no adsorption area 48 is provided on the upper surface of the top panel 46.

The plurality of cryosorption panels 44 may have the same shape as shown in the figure or may have different shapes (for example, different diameters). A cryosorption panel 44 among the plurality of cryosorption panels 44 may have the same shape as that of a cryosorption panel 44 that is adjacent in the upper direction or may be larger than the adjacent cryosorption panel 44. As a result, the bottom panel 47 may be larger than the top panel 46. The area of the bottom panel 47 may be about 1.5 to about 5 times the area of the top panel 46.

Also, intervals among the plurality of cryosorption panels 44 may be constant as shown in the figure or may be different from one another.

The cryopump suggested earlier by the present applicant is also provided with a cryopanel assembly suitable for pumping non-condensable gas or with arrangement of a plurality of cryosorption panels. Such a cryopump is disclosed in, for example, Japanese Unexamined Patent Publication No. 2012-237262, Published U.S. Patent Application No. 2013/0008189, and Japanese Patent Application No. 2012-249001, which are incorporated herein in their entirety by reference.

The radiation shield 30 is provided to protect the cryopanel assembly 20 from radiant heat emitted from the cryopump housing 38. The radiation shield 30 is located between the cryopump housing 38 and the cryopanel assembly 20 and surrounds the cryopanel assembly 20. The radiation shield 30 includes a shield front end 28 that defines a shield opening 26, a shield bottom portion 34 opposite to the shield opening 26, and a shield side portion 36 that extends from the shield front end 28 to the shield bottom portion 34. The shield opening 26 is located at the inlet 12. The radiation shield 30 has a tubular shape (e.g., cylindrical) where the shield bottom portion 34 is closed and is formed into a cup-like shape.

The shield side portion 36 has a hole for mounting the refrigerator 16, and the second stage 24 of the refrigerator 16 is inserted inside the radiation shield 30 via the hole. The first stage 22 is fixed to the outer surface of the radiation shield 30 at the outer circumferential portion of the mounting hole. The radiation shield 30 is thermally connected to the first stage 22 in this way.

The radiation shield 30 may not be formed into an integrated tubular shape as illustrated, but formed to have a tubular shape as a whole by a plurality of parts. The plurality of parts may be arranged so as to have gaps among one another. For example, the radiation shield 30 may be divided into two portions in the axial direction. In this case, the upper portion of the radiation shield 30 is a tube whose both ends are open, whereas the lower portion of the radiation shield 30 has an open upper end and has the shield bottom portion 34 at the lower end thereof.

The radiation shield 30 forms a gas receiving space 50 that surrounds the cryopanel assembly 20 between the inlet 12 and the shield bottom portion 34. The gas receiving space 50 is part of the internal space 14 of the cryopump 10 and is an area that is adjacent to the cryopanel assembly 20 in the radial direction. The gas receiving space 50 surrounds the respective outer circumferences of the cryosorption panels 44 across from the inlet 12 to the shield bottom portion 34 in the axial direction.

The radiation cover 32 is provided at the inlet 12 to protect the cryopanel assembly 20 from radiant heat emitted from a heat source outside the cryopump 10 (for example, a heat source inside a vacuum chamber on which the cryopump 10 is mounted). The radiation cover 32 is mounted to the shield front end 28 via a cover mounting member (not shown). As described, the radiation cover 32 is fixed to the radiation shield 30 and is thermally connected to the radiation shield 30.

The radiation cover 32 includes a main plate 52 and a louver portion 54. The main plate 52 is arranged at a place that corresponds to the cryopanel assembly 20 in the inlet 12. The cryopanel assembly 20 is located at the center of the internal space 14. Thus, the main plate 52 is located at the center of the inlet 12. The louver portion 54 is arranged at a place that corresponds to the gas receiving space 50 in the inlet 12. The gas receiving space 50 is located at the outer circumferential portion of the internal space 14 in such a manner that the gas receiving space 50 surrounds the cryopanel assembly 20. Thus, the louver portion 54 is located at the outer circumferential portion of the inlet 12.

The main plate 52 is located above the cryopanel assembly 20 in the axial direction and covers the cryopanel assembly 20. The main plate 52 faces the top panel 46. The main plate 52 covers at least 80 percent or at least 90 percent of the vertical projection area of the top panel 46 in the axial direction. The main plate 52 may cover the entire vertical projection area of the top panel 46 in the axial direction. As described above, the main plate 52 forms a shielding part at the inlet 12. Therefore, thermal radiation directed to the top panel 46 of the cryopanel assembly 20 can be shielded by the main plate 52.

The main plate 52 may cover part of the vertical projection area of the cryopanel assembly 20 (for example, the bottom panel 47) in the axial direction. The main plate 52 may cover at least 20 percent, at least 30 percent, at least 40 percent, or at least 50 percent of the vertical projection area of the cryopanel assembly 20 (for example, the bottom panel 47) in the axial direction. For example, if the area of the bottom panel 47 is about 3.5 times the area of the top panel 46, 80 percent of the vertical projection area of the top panel 46 in the axial direction corresponds to about 23 percent of the vertical projection area of the bottom panel 47 in the axial direction.

The main plate 52 occupies at most ⅓ (i.e., one third) or at most ¼ (i.e., one quarter) of the opening area of the inlet 12. In this way, an open area 56 that corresponds to at least ⅔ or at least ¾ of the opening area of the inlet 12 is formed outside the main plate 52. The open area 56 is formed in an annular shape between the main plate 52 and the shield front end 28 of the radiation shield 30. The external space of the cryopump 10 is connected to the internal space 14 by the open area 56. The open area 56 continues to the gas receiving space 50. Therefore, gas can be received in the gas receiving space 50 via the open area 56.

The main plate 52 is a flat plate that extends along the transverse direction, i.e., the radial direction of the inlet 12. The main plate 52 is, for example, a disk. A typical cryopump louver includes a number of louver boards, and a considerable amount of expense is thus required for the processing and assembling of those louver boards. However, according to the present embodiment, there is an advantage that the radiation cover 32 can be manufactured at low cost by forming the main part of the radiation cover 32 by a flat plate.

The louver portion 54 is arranged in the open area 56. The louver portion 54 includes a plurality of louver boards 58 that are provided to cross the transverse direction of the inlet 12 such that the plurality of louver boards 58 has a first height H1 in a height direction that is perpendicular to the transverse direction (i.e., the axial direction). Each of the louver boards 58 is a ring member that is formed into a shape of the side surface of a truncated cone having a diameter different from others and is arranged concentrically with others. Each of the louver boards 58 is directed obliquely downward in a radially outward direction. Accordingly, clearances among the louver boards 58 are directed toward the shield side portion 36. Each of the louver board 58 slopes at the same angle as others (e.g., 45 degrees). The louver boards 58 may be provided such that the louver boards 58 vertically cross the transverse direction of the inlet 12. The louver portion 54 may be formed into another shape, such as a lattice shape.

The main plate 52 has a second height H2 in a height direction that is perpendicular to the transverse direction of the inlet 12 (i.e., the axial direction). The second height H2 is smaller than the first height H1. In the present embodiment, the second height H2 represents the thickness of the main plate 52. The main plate 52 is housed in the louver portion 54. The main plate 52 is a wide louver board that is laid along the transverse direction of the inlet 12. Thus, the radiation cover 32 includes: narrow louver boards that are provided such that the narrow louver boards cross the transverse direction having the first height H1 in the height direction; and a wide louver board that is provided such that the wide louver board has the second height H2 in the height direction. As described above, by partially using a large-size louver board, a shielding part can be efficiently formed at the inlet 12 with a small number of components.

The height of the radiation cover 32 is determined by the height of the louver portion 54. The main plate 52 does not cause an increase in the height of the radiation cover 32. Therefore, a typical louver structure can be replaced with the radiation cover 32 without interfering with surrounding constituting elements such as the cryopanel assembly 20.

The cryopump housing 38 is a container of the cryopump 10 that houses the first cryopanel 18 and the cryopanel assembly 20. The inlet 12 is defined by a front end 40 of the cryopump housing 38. The cryopump housing 38 is a vacuum chamber configured to maintain vacuum airtightness of the internal space 14.

When the cryopump 10 is operated, the first cryopanel 18 (the radiation shield 30 and the radiation cover 32) is cooled to the first temperature level, and the cryopanel assembly 20 is cooled to the second temperature level, which is lower than the first temperature level, as described above. In FIG. 1, radiant heat and hydrogen molecules that are directed toward the inlet 12 from the outside of the cryopump 10 are illustrated by respective solid arrows and broken-line arrows, respectively.

The radiation cover 32 shields the radiant heat at the inlet 12. The main plate 52 is provided such that the main plate 52 substantially covers the cryopanel assembly 20 as described above. Thus, the radiant heat toward the cryopanel assembly 20 is shielded. The louver boards 58 of the louver portion 54 also shield heat. Part of the radiant heat enters the internal space 14 via the clearances among the louver boards 58 of the louver portion 54. Since the clearances among the louver boards 58 are directed to the radiation shield 30, the radiant heat that has entered is absorbed by the radiation shield 30.

The radiation cover 32 allows for the passage of part of gas molecules (e.g., non-condensable gas such as hydrogen molecules) that enter the inlet 12. The gas molecules enter the gas receiving space 50 via the clearances among the louver boards 58 of the louver portion 54. The gas molecules that have entered are reflected by the radiation shield 30 and are directed to the cryopanel assembly 20. The gas molecules are then adsorbed onto an adsorption area of the cryopanel assembly 20.

As described above, the cryopump 10 has design where the adsorption area 48 is not exposed to the inlet 12. For example, no adsorption area 48 is provided on the upper surface of the top panel 46. The upper surface of the top panel 46 and other exposed portions are condensation areas and do not have ability to adsorb non-condensable gas.

The radiation cover 32 according to the present embodiment is particularly preferred for such a non-exposing type cryopanel assembly 20. If a typical cryopump louver structure is applied to the cryopump 10, gas molecules enter a non-adsorption area (e.g., the upper surface of the top panel 46) via clearances among louver boards. The gas molecules are reflected and then return to the outside of the cryopump 10 or head to other sites within the cryopump 10. In the same way as in the gas molecules, radiant heat also becomes incident on a non-adsorption area in a linear manner. In other words, despite that the exposed non-adsorption area is not useful for adsorbing gas, the exposed non-adsorption area is exposed to the radiant heat. Heat load caused by the radiant heat causes the refrigeration power of the refrigerator 16 to be wasted.

According to the present embodiment, instead of a typical louver structure, a place that corresponds to the cryopanel assembly 20 in the inlet 12 is covered by the main plate 52. Therefore, unnecessary heat load on the cryopanel assembly 20 is effectively suppressed. Since the main plate 52 merely prevents gas molecules that would be incident on the non-adsorption area, the main plate 52 does not have any influence on the pumping speed of non-condensable gas. Thus, the heat load can be reduced without reducing the pumping speed of non-condensable gas.

Such advantages can be also obtained in a cryopump having design where an adsorption area 48 is exposed. Therefore, the cryopump 10 may have an adsorption area 48 on the top panel 46 and other exposed parts.

The cryopanel assembly 20 that is suitable for the high-speed pumping of non-condensable gas tends to be long in the axial direction. This is for the purpose of forming a large-size adsorption area by arranging a number of cryosorption panels 44 in the internal space 14. As the cryopanel assembly 20 becomes longer in the axial direction, the upper portion of the cryopanel assembly 20 is arranged closer to the inlet 12. Thus, heat load on the cryopanel assembly 20 becomes larger. Covering of the cryopanel assembly 20 by the main plate 52 makes it harder for gas molecules to be directly incident on the upper portion of the cryopanel assembly 20. However, most of the gas molecules reach the adsorption area 48 of the cryopanel assembly 20 via the gas receiving space 50 (e.g., by the reflection by the radiation shield 30). In other words, a decrease in the pumping speed caused by the main plate 52 is in an acceptable range in many cases. Therefore, it is considered meaningful to reduce heat load by using the main plate 52 even in a cryopump having design where an adsorption area 48 thereof is exposed.

In order to secure a sufficiently-large gas receiving space 50, at least the upper portion of the cryopanel assembly 20 (e.g., top panel 46) is relatively small as viewed in the axial direction. For example, 80 percent, 90 percent, or the entirety of the vertical projection area of the top panel 46 in the axial direction is smaller than one third of the opening area of the inlet 12. Alternatively, 80 percent, 90 percent, or the entirety of the vertical projection area of the top panel 46 in the axial direction may be smaller than one fourth of the opening area of the inlet 12. As described, the width of the gas receiving space 50 (e.g., the distance between the cryosorption panel 44 and the radiation shield 30) can be set such that enough gas molecules are received in the gas receiving space 50.

Figure 2:
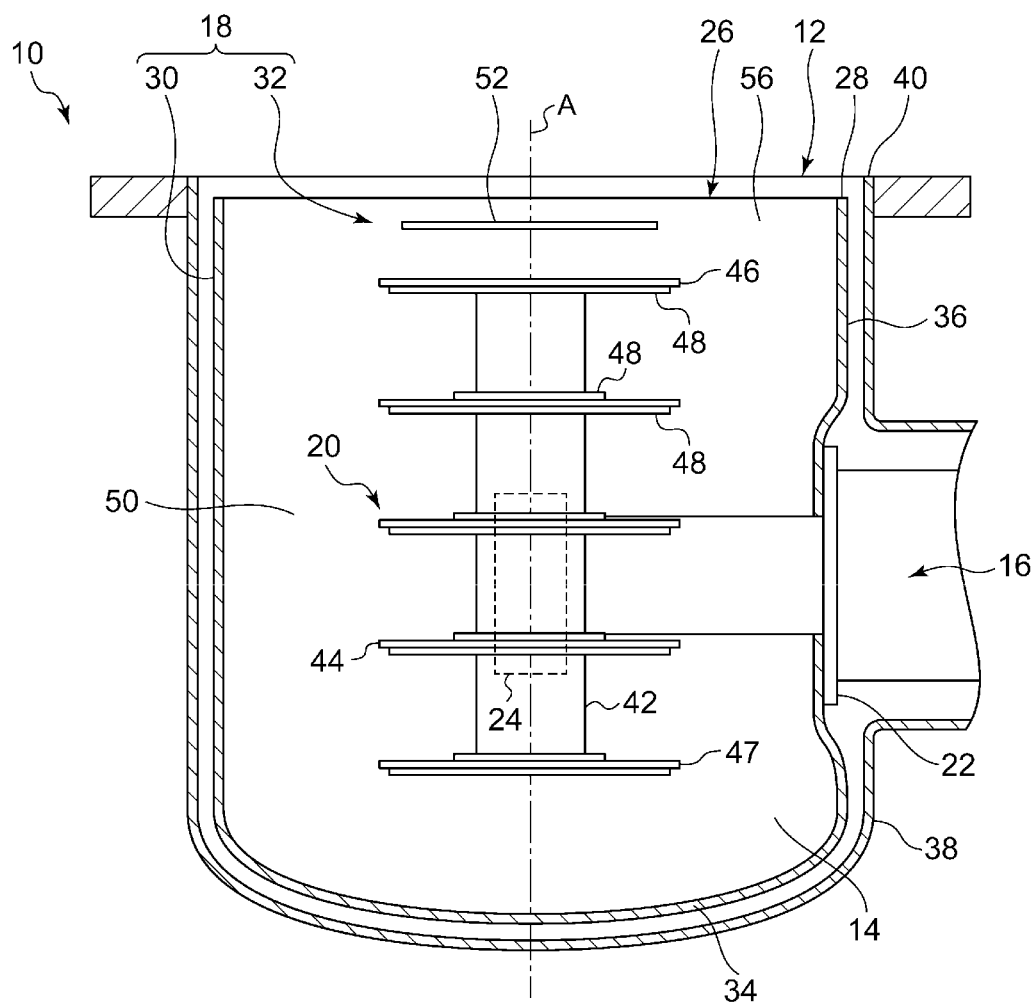
FIG. 2 is a cross-sectional view schematically illustrating the principal part of a cryopump according to another embodiment of the present invention.

FIG. 2 is a cross-sectional view schematically illustrating a cryopump 10 according to another embodiment of the present invention. In the cryopump 10 shown in FIG. 2, a radiation cover 32 of the cryopump 10 does not include a louver portion 54, unlike the case of the cryopump 10 shown in FIG. 1. Regarding the other features of the cryopump 10, the same as in the case of cryopump 10 shown in FIG. 1 applies.

An area of an inlet 12 located outside a main plate 52 is an open area 56, which is open in such a manner that a gas receiving space 50 is connected to the outside of the cryopump 10. The radiation cover 32 is composed of the main plate 52 and a cover mounting member (not shown) for mounting the main plate 52 on a radiation shield 30. The open area 56 is an uncovered part of the opening area of the inlet 12 that is not covered by the radiation cover 32 and is substantially completely open. By not having a louver portion 54 in the open area 56, the conductance of the inlet 12 becomes large. This allows for an increase in the pumping speed of non-condensable gas.

The removal of the louver portion 54 may increase heat load through the open area 56. However, since the cryopump 10 shown in FIG. 2 includes the main plate 52, an increase in the heat load on the cryopanel assembly 20 from the open area 56 can be reduced or canceled by the main plate 52. Thus, this embodiment also allows for an increase in the pumping speed of non-condensable gas without increasing the heat load on the cryopanel assembly 20, in comparison to a case where a typical louver structure is used.

Described above is an explanation based on the exemplary embodiments of the present invention. The invention is not limited to the above-mentioned embodiments, and various design modifications may be added. It will be obvious to those skilled in the art that such modifications are also within the scope of the present invention.

In the above-stated embodiments, cryosorption panels 44 such as a top panel 46, a bottom panel 47, and the like have a plate-like structure. However, the cryosorption panels 44 may have a three-dimensional structure. For example, the top panel 46 may have a portion that protrudes and extends toward an inlet 12 or a main plate 52. Similarly, the bottom panel 47 may have a portion that protrudes and extends toward a shield bottom portion 34. An adsorption area may be formed on a surface of such an extended portion.

In the above-stated embodiments, a main plate 52 has a plate-like structure. However, the main plate 52 may have a three-dimensional structure. For example, the main plate 52 may have an inclined surface that crosses the transverse direction of an inlet 12. For example, louver boards 58 may be mounted on the outer circumference of the main plate 52.

The main plate 52 may not be a single flat plate member. The main plate 52 may be divided into a plurality of plate portions. Alternatively, the main plate 52 may have an opening or a slit.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2013-43541, filed on Mar. 5, 2013, the entire content of which is incorporated herein by reference.

What is claimed is:

1. A cryopump comprising:
   a cryopump inlet;
   a cryopump bottom axially remote from the cryopump inlet;
   a cryopanel assembly comprising a top panel located closest to the cryopump inlet and a plurality of cryopanels arranged between the top panel and the cryopump bottom, the cryopanels arranged axially spaced apart from each other at an axial interval, each of the cryopanels comprising a front cryopanel surface directed to the cryopump inlet and comprising a front adsorption area thereon and a back cryopanel surface directed to the cryopump bottom and comprising a back adsorption area thereon;
   a radiation shield forming a gas receiving space that surrounds the cryopanel assembly; and
   a radiation cover disposed in the cryopump inlet, the radiation cover comprising a main plate located at a first position in the cryopanel inlet that corresponds to the cryopanel assembly, the radiation cover faces the top panel, an axial distance from the main plate to the top panel being smaller than the axial interval of the cryopanels, and a louver portion located at a second position in the cryopanel inlet that corresponds to the gas receiving space,
   wherein the entire surface of the main plate is flat, the main plate comprises a flat periphery radially extending in a plane perpendicular to an axial direction of the cryopump,
   wherein the entire surface for each of the cryopanels is flat, a distance between the cryopanel assembly and the main plate is 5 cm or less.

2. The cryopump according to claim 1,
   wherein the louver portion comprises a plurality of louver boards that are provided to cross a transverse direction of the cryopump inlet such that the plurality of louver boards have a first height in a height direction that is perpendicular to the transverse direction, and
   wherein the main plate has a second height that is smaller than the first height in the height direction.

3. The cryopump according to claim 1,
   wherein the main plate covers at least 80 percent of a projection area of the top panel and occupies at most ⅓ of an opening area of the cryopump inlet.

4. The cryopump according to claim 1,
   wherein the main plate is a flat plate that extends along a transverse direction of the cryopump inlet.

5. The cryopump according to claim 1,
   wherein the louver portion comprises a plurality of louver boards that are provided to cross a transverse direction of the cryopump inlet, a most inner louver board of the louver boards arranged contactlessly and closest to the main plate in the transverse direction to form a transverse gap between the most inner louver board and the main plate.

6. A cryopump comprising:
   a cryopump inlet;
   a cryopump bottom axially remote from the cryopump inlet;
   a cryopanel assembly comprising a top panel located closest to the cryopump inlet and a plurality of cryopanels arranged between the top panel and the cryopump bottom, each of the cryopanels comprising a front cryopanel surface directed to the cryopump inlet and comprising a front adsorption area thereon and a back cryopanel surface directed to the cryopump bottom and comprising a back adsorption area thereon;
   a radiation shield comprising a radiation shield inner surface extending from the cryopump inlet to the cryopump bottom and surrounding the cryopanel assembly; and
   a radiation cover plate disposed in the cryopump inlet, the radiation cover forms an uncovered open area extending transversely from the cover plate to the radiation shield inner surface,
   wherein the radiation cover plate faces the top panel and covers at least 80 percent of a projection area of the top panel and that occupies at most ⅓ of an opening area of the cryopump inlet, and
   wherein the entire surface for each of the cryopanels is flat, a distance between the cryopanel assembly and the radiation cover plate is 5 cm or less, and
   wherein the entire surface of the radiation cover plate is flat, the radiation cover plate comprises a flat periphery radially extending in a plane perpendicular to an axial direction of the cryopump.

7. The cryopump according to claim 6,
   wherein the radiation shield forms a gas receiving space between the radiation shield inner surface and the cryopanel assembly, the gas receiving space connected to outside of the cryopump through the uncovered open area.

8. The cryopump according to claim 6,
   wherein the cover plate is a flat plate that extends along a transverse direction of the cryopump inlet.

9. The cryopump according to claim 6,
   wherein the cryopanels are arranged axially spaced apart from each other at an axial interval, an axial distance from the cover plate to the top panel being smaller than the axial interval of the cryopanels.

10. A cryopump comprising:
    a cryopump inlet;
    a cryopump bottom axially remote from the cryopump inlet;
    a cryopanel assembly comprising a top panel located closest to the cryopump inlet and a plurality of cryopanels arranged between the top panel and the cryopump bottom, the cryopanels arranged axially spaced apart from each other at an axial interval, each of the cryopanels comprising a front cryopanel surface directed to the cryopump inlet and comprising a front adsorption area thereon and a back cryopanel surface directed to the cryopump bottom and comprising a back adsorption area thereon;
    a radiation shield forming a gas receiving space that surrounds the cryopanel assembly; and
    a radiation cover disposed in the cryopump inlet, the radiation cover comprising a main plate located at a first position in the cryopanel inlet that corresponds to the cryopanel assembly, the radiation cover facing the top panel, wherein the entire surface of the main plate is flat, the main plate comprises a flat periphery radially extending in a plane perpendicular to an axial direction of the cryopump, wherein the entire surface of the top panel is flat, a distance between the cryopanel assembly and the main plate is 5 cm or less.

11. The cryopump according to claim 10,
wherein an axial distance from the main plate to the top panel being smaller than the axial interval of the cryopanels.

12. The cryopump according to claim 10,
wherein the radiation cover comprises a louver portion located at a second position in the cryopanel inlet that corresponds to the gas receiving space.

13. The cryopump according to claim 12,
wherein the louver portion comprises a plurality of louver boards that are provided to cross a transverse direction of the cryopump inlet such that the plurality of louver boards have a first height in a height direction that is perpendicular to the transverse direction, and wherein the main plate has a second height that is smaller than the first height in the height direction.

14. The cryopump according to claim 12,
wherein the louver portion comprises a plurality of louver boards that are provided to cross a transverse direction of the cryopump inlet, a most inner louver board of the louver boards arranged contactlessly and closest to the main plate in the transverse direction to form a transverse gap between the most inner louver board and the main plate.

15. The cryopump according to claim 10,
wherein the main plate covers at least 80 percent of a projection area of the top panel and occupies at most ⅓ of an opening area of the cryopump inlet.

16. The cryopump according to claim 10,
wherein the main plate is a flat plate that extends along a transverse direction of the cryopump inlet.

17. The cryopump according to claim 10,
wherein the radiation shield comprises a radiation shield inner surface extending from the cryopump inlet to the cryopump bottom and surrounding the cryopanel assembly, wherein the main plate forms an uncovered open area extending transversely from the main plate to the radiation shield inner surface.

18. The cryopump according to claim 17,
wherein the gas receiving space is connected to outside of the cryopump through the uncovered open area.

* * * * *